United States Patent

Stone et al.

[11] 3,925,296
[45] Dec. 9, 1975

[54] FOUNDRY AGGREGATE BINDERS

[75] Inventors: Jonathan A. Stone, Heath, Ohio; Albert W. Bluemle, North Tonawanda, N.Y.

[73] Assignee: Hooker Chemicals & Plastics Corporation, Niagara Falls, N.Y.

[22] Filed: Jan. 2, 1974

[21] Appl. No.: 430,324

Related U.S. Application Data

[63] Continuation-in-part of Ser. No. 197,503, Nov. 10, 1971, abandoned, and Ser. No. 192,627, Oct. 26, 1971, abandoned, which is a continuation-in-part of Ser. No. 787,262, Dec. 26, 1968, abandoned.

[52] U.S. Cl. ............ 260/37 N; 164/43; 260/67 FA; 260/67 TN; 260/DIG. 40
[51] Int. Cl.² .................................. C08L 75/04
[58] Field of Search ........ 260/67 FA, 67 TN, 37 N, 260/DIG. 40; 164/43

[56] References Cited
UNITED STATES PATENTS

| | | | |
|---|---|---|---|
| 2,343,972 | 3/1944 | Harvey | 260/67 |
| 2,374,136 | 4/1945 | Rathrock | 260/22 |
| 3,428,110 | 2/1969 | Walker et al. | 164/43 |

Primary Examiner—Donald E. Czaja
Assistant Examiner—S. M. Person
Attorney, Agent, or Firm—Peter F. Casella; James F. Mudd

[57] ABSTRACT

Binders for foundry aggregates comprise (1) a phenolic compound and an organic polyisocyanate, (2) a substantially non-aqueous, organic solvent soluble condensation product of a furan alcohol and an aldehyde, a polyisocyanate and a phenolic compound, and (3) an organic polyisocyanate and a substantially non-aqueous, organic solvent soluble condensation product of a furan alcohol and an aldehyde. Said phenolic compound can be represented by the formula:

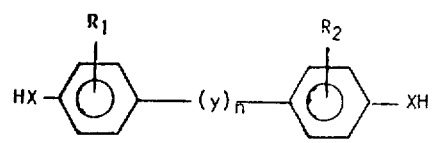

wherein X is oxygen or sulfur, $y$ is an alkylidene radical, an arylene radical, an aryl bis alkylene radical, $-S-$, $-S-S-$, or

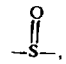

$n$ is 0 or 1, and $R_1$ and $R_2$ are hydrogen, alkyl of 1 to 6 carbon atoms or halogen. The binders are useful in preparing foundry aggregate compositions which can be cured at room temperature.

45 Claims, No Drawings

FOUNDRY AGGREGATE BINDERS

This is a continuation-in-part of copending applications Ser. No. 197,503, filed Nov. 10, 1971, now abandoned and Ser. No. 192,627, filed Oct. 26, 1971, now abandoned which are continuation-in-part applications of copending application Ser. No. 787,262, filed Dec. 26, 1968, now abandoned.

BACKGROUND OF THE INVENTION

Foundry molds and cores used in making metal castings can be prepared from a mixture of an aggregate material which has been combined with a binding amount of a polymerizable or curable binder. The mixture is thereafter rammed, blown or otherwise introduced into a pattern and cured by the use of catalysts such as chlorine and carbon dioxide, and/or the application of heat. The present invention provides novel resin binders that cure at low temperatures, or even at room temperature.

Accordingly, it is an object of the invention to provide novel resin binders for foundry aggregates. it is also an object of the invention to provide novel resin binders for foundry aggregates that are capable of curing at low temperatures, even at room temperature. These and other objects will become apparent to one skilled in the art in the light of the following specification.

SUMMARY OF THE INVENTION

This invention relates to novel foundry aggreagate binders. More particularly, the invention relates to binders for foundry aggregates which comprise (1) a phenolic compound and an organic polyisocyanate, (2) a phenolic compound, an organic polyisocyanate and a substantially non-aqueous, organic solvent soluble condensation product of an aldehyde with a furan alchol, or (3) an organic polyisocyanate and a substantially non-aqueous, organic solvent soluble condensation product of an aldehyde with a furan alcoho; wherein said furan alcohol is of the formula:

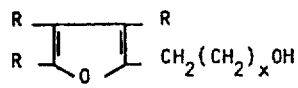

wherein $x$ is 0 to 4 and wherein each R is individually selected from the group consisting of hydrogen, alkyl of 1 to 8 carbon atoms and halogen.

The phenolic compound utilized in the invention can be a compound such as bisphenols, biphenols, thiodiphenols, sulfonyl diphenols, mercaptodiphenols. Said phenolic compound can be represented by the formula:

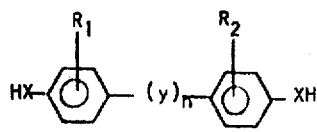

wherein X is oxygen or sulfur, y is an alkylidene radical, an arylene radical, $-S-$, $-S-S-$, or

$n$ is 0 or 1, and $R_1$ and $R_2$ are hydrogen, alkyl of 1 to 6 carbon atoms, or halogen. The monomeric compound contain two or more active hydrogens capable of reacting with the organic polyisocyanate of the invention. Further in accordance with the invention, there is also provided moldable compositions comprising foundry aggregate and the novel foundry aggregate binders. The invention also provides for foundry molds and cores comprised of foundry aggregate that is consolidated with the novel foundry aggregate binders.

DESCRIPTION OF THE PREFERRED EMBODIMENTS

The substantially non-aqueous component of the binders of this invention are prepared by condensing a furan alcohol with an aldehyde.

The furan alcohol is of the formula:

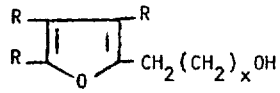

wherein $x$ is 0 to 4 and wherein each R is individually selected from the group consisting of hydrogen, alkyl of 1 to 8 carbon atoms and halogen. Suitable furan alcohols include furfuryl alcohol; 2-(2-furyl) ethyl alcohol; 3-(2-furyl)propyl alcohol; 4-(2-furyl)butyl alcohol; 5-(2-furyl)pentyl alcohol; alkyl furan alcohols such as methyl furfuryl alcohol, ethyl furfuryl alcohol, and the like; 3-(2-furyl-4-methyl) propyl alcohol; halo-furan alcohols such as chloro-furfuryl alcohol, bromo-furfuryl alcohol, and fluoro-furfuryl alcohol; and the like. The preferred furan alcohol is furfuryl alcohol.

Aldehydes capable of reacting with the furan alcohol are satisfactory provided the aldehydes do not contain a functional group or structure which is detrimental to the condensation reaction. The preferred aldehyde is formaldehyde, which can be in aqueous solution or in any of its polymeric forms such as paraform or trioxane. The aldehydes perferably contain 1 to 8 carbon atoms. Other examples include acetaldehyde, propionaldehyde, butyraldehyde, benzaldehyde, furfural, 2-ethylhexanal, ethylbutyraldehyde, heptaldehyde, glyoxal, chloral, and the like.

While it is not strictly necessary to employ any aldehyde in the condensation reaction due to the in situ formation of formaldehyde, it is preferred to employ a minor amount of aldehyde. The amount of aldehyde employed can be about 0.01 to about 50 weight percent based on the total weight of the composition, preferably about 3 to about 6 weight percent. The furan alcohol and aldehyde are heated to reflux conditions and maintained at that temperature until the resinous product (non-solvated) has a refractive index of about 1.5300 to about 1.5600, preferably about 1.5300 to about 1.5400 when formaldehyde is employed. It is preferred to employ an acid catalyst during the condensation. Mineral acids such as sulfuric acid, hydrochloric acid, zinc chloride, phosphorus pentoxide, chromic acid, mercuric chloride, and organic acids, such as oxalic acid, diethyl sulfate, and the like, can be employed. When the condensation has proceeded to the desired extent, the resin is neutralized with an alkaline compound such as sodium hydroxide and dehydrated until it is substantially non-aqueous, i.e., until there is less than about 5 weight percent water based on the weight of the resin, preferably less than about 1 percent. When the furan alcohol is furfuryl alcohol and the aldehyde is formaldehyde, the condensation product has the formula:

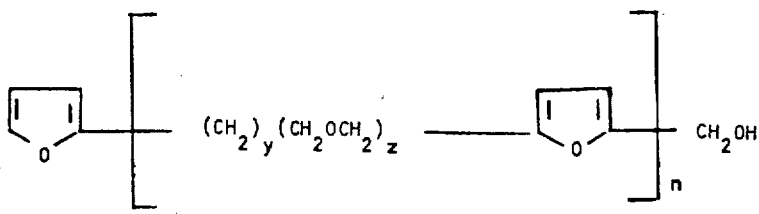

wherein each individual $y$ and $z$ is 0 or 1, the sum of $y$ and $z$ in each repeating unit is 1, the ratio of $y$ to $z$ is greater than 1, and $n$ is 1 to 8. The preferred average molecular weight of the resin is about 450 to about 500 and the resin has an average hydroxyl reactivity of about 290 to about 310 at room temperature.

The condensation can be carried out with or without the addition of a diluent. If a condensation is effected without a diluent, the product is preferably thereafter mixed with a suitable solvent. Suitable solvents or diluents for the furan alcohol-aldehyde condensate include the aromatic hydrocarbons of 6 to 10 carbon atoms such as benzene, toluene, xylene, ethylbenzene, diethylbenzene, monochlorobenzene, and the like. Other suitable solvents or diluents include the monoester-monoethers of alkylene glycols of 2 to 10 carbon atoms such as ethylene glycol (Carbitol), diethylene glycol (Cellosolve), propylene glycol, butylene glycol, and the like. Typical members of the foregoing class include Cellosolve acetate, methyl Cellosolve acetate, butyl Cellosolve acetate, Carbitol acetate, butyl Carbitol acetate, and mixtures thereof. Mixtures of the foregoing classes of solvent or diluents can be employed. Auxiliary solvents can also be admixed with the foregoing classes of solvents or diluents; for example, aliphatic hydrocarbons, such as hexane, octane, mineral spirits, petroleum naphtha, and the like. The condensation product and the solvent are mixed until a uniform homogeneous mixture is formed. The solvent is generally employed in a ratio of about 10 to about 40 parts by weight per 100 parts of resinous, fusible, condensation product, preferably in a range from about 20 to about 25 parts by weight of solvent per 100 parts of resinous product. The resinous condensation product-solvent composition generally has a viscosity in the range of about 50 to about 400 centipoises at 25° centigrade and a hydroxyl reactivity number in the range from about 300 to about 500. The binder composition comprising said condensation product, organic polyisocyanate, and solvent when mixed together contains solvent generally in the proportion of about 10 to about 50 parts by weight of solvent per 100 parts of total mixed solids of said condensation product together with said organic polyisocyanate, preferably in the proportion of about 15 to about 35 parts by weight of solvent per 100 parts of total mixed solids of said condensation product and said organic polyisocyanate.

The phenolic compounds of the invention referred to as "bisphenols" are comprised of dihydric diphenols with a single carbon between the rings. These are available from any aldehyde and from many ketones reacted with any phenol having an open ortho- or para- position. The bisphenols herein referred to have the general formula:

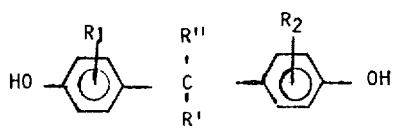

wherein R' and R'' are hydrogen, alkyl of 1 to 6 carbon atoms, cycloakyl of 5 to 6 carbon atoms, and haloalkyl of 1 to 6 carbon atoms, and can be the same or different. $R_1$ and $R_2$ are hydrogen, alkyl of 1 to 6 carbon atoms, or halogen. Representative bisphenol isomers are the o,o'-bisphenol, m,m'- bisphenol, p,p'-bisphenol, m,p-bisphenol, o,p-bisphenol, and o,m-bisphenol. Representative biscresols are 4,4'-bis-o-cresol, 6,6'-bis-o-cresol and 4,4'- bis-m-cresol. They are commonly prepared by reacting a phenol, for instance, phenol, ortho-cresol, meta-cresol, ortho-isopropylphenol, ortho-tertiary butylphenol, ortho-chlorophenol, various thio-substituted phenols, etc., with a ketone, such as acetone, methyl ethyl ketone, dibenzyl ketone, diethyl ketone, dibutyl ketone, cyclohexanone, etc., in the presence of a strong mineral acid, such as sulfuric or hydrochloric acid. The reaction may be carried out at room temperature but is usually conducted at temperatures from 30° to 90° C. As the reaction progresses, the bisphenol product solidifies. After completion of the reaction, the mixture is a thick slurry or mass comprising the bisphenol product, uncondensed phenol, and the mineral acid employed to promote the reaction. Alternately, an aldehyde can be used instead of a ketone to form the bisphenols of the invention. In addition to formaldehyde, acetaldehyde, butyraldehyde, benzaldehyde, furfuryl, etc., can be used. Acetylene, which in many of its reactions, behaves as if it were the anhydride of acetalidehyde, can also be used in place of an aldehyde or ketone to obtain a bisphenol suitable for use as a phenolic compound of the invention. The reaction for the formation of a bisphenol from an aldehyde can be carried out in a known manner and a detailed description of this reaction is unnecessary. However, it may be mentioned that a strong mineral acid in high concentrations, such as sulfuric acid or hydrochloric acid, preferably the latter, is used to promote the condensation, and that the yield of the bisphenol is highest when the phenolic reactant is employed in a proportion exceeding that theoretically required.

Representative bisphenols that can be utilized in the invention are bisphenols A, F, C and H. Bisphenol C and H are shown structurally as follows:

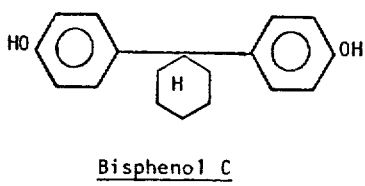

Bisphenol C

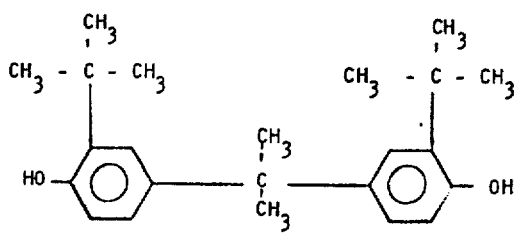

Bisphenol H

By the appropriate selection of halogenated phenol, halogenated bisphenol-A homologs can be obtained. Thus, by the reaction of acetone and ortho-chlorophenol, the dichloro-bisphenol-A compound may be obtained. By the reaction of ortho, ortho-dibromophenol with acetone, the 4,4'- isopropylidene-bis(2,6-dibromopheno) compound can be obtained. A suitable bisphenol-A ester can be obtained by the reaction of bisphenol-A and salicylic acid which is 4,4'-isopropylidene diphenol disalicylate.

Other bisphenols useful in the invention are: 2,2-bis(4-hydroxyphenyl)1,1,3,3-tetrafluoro-1,3-dichloropropane, 2,2-bis(4-hydroxyphenyl) 1,1,1,3,3pentafluoro-3-chloropropane and their derivatives. This may be represented by the following formula:

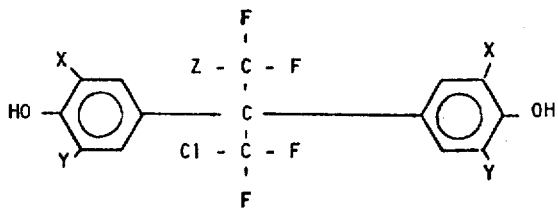

wherein Z is chlorine or fluorine and X and Y are hydrogen, chlorine or bromine, or alkyl radicals of 1 to 4 carbon atoms.

2,2-bis(4-hydroxyphenyl)1,1,3,3-tetrafluoro-1,3-dichloropropane and its derivatives may be represented by the general formula:

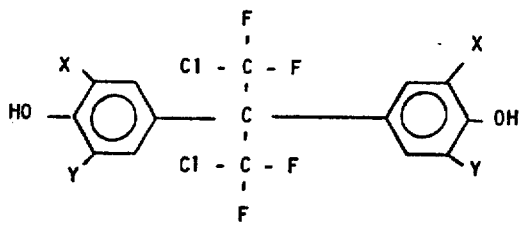

2,2-bis(4-hydroxyphenyl)1,1,1,3,3-pentafluoro-3-chloropropane and its derivatives may be represented by the general formula:

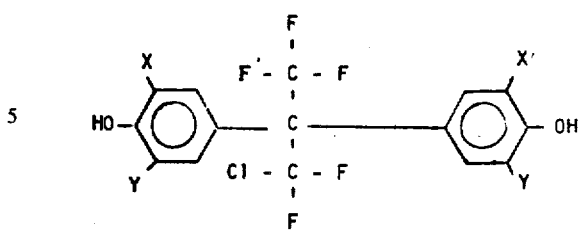

The halogenated bisphenols of the invention are readily prepared by reacting 1,1,3,3-tetrafluoro-1,3-dichloroacetone or 1,1,1,3,3-pentafluoro-3-chloroacetone with a phenolic compound of the formula:

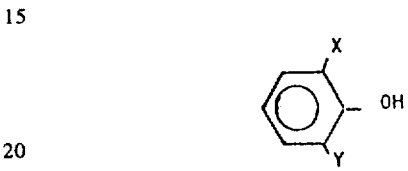

X and Y being as defined above, in a molar ratio of at least about 1.5 mols of phenolic compound per mol of ketone reactants, in the presence of boron trifluoride as catalyst.

1,1,3,3-tetrafluoro-1,3-dichloroacetone is a colorless liquid having a freezing point below -100°C. and a boiling point of 45.2°C. 1,1,1,3,3-pentafluoro-3-chloroacetone is a colorless gas having a boiling point of 7.8°C.

As the phenolic reactants there may be used phenol itself or its alkylated, brominated or chlorinated derivatives, in which any such substituent are adjacent to the hydroxyl group.

The phenolic compound referred to as a "biphenol" can have the general formula:

HO — R — R — OH wherein R is an aryl group. Representative biphenols are o,o'-biphenol, m,m'-biphenol, p,p'-biphenol; bicresols, such as 4,4'-bi-o-cresol, 6,6'-bi-o-cresol, 4,4'-bi-m-cresol; dibenzyl biphenols such as a, a'-diphenol-4,4'-bi-o-cresol; diethyl biphenols such as 2,2'-diethyl-p,p'-biphenol, and 5,5'-diethyl-o,o'-biphenol; dipropyl biphenols such as 5,5'-dipropyl-o,o'-biphenol and 2,2'-diisopropyl-p,p'-biphenol; diallyl biphenols such as 2,2'-diallyl-p,p'-biphenol; and dihaiobiphenols, such as 4,4'-dibromo-o,o'-biphenol.

With regard to the dibenzyl biphenols, the positions of the phenolic hydroxyl groups and the benzyl radicals may be varied to obtain other useful compounds corresponding, e.g. to the bicresols listed above with various positions of the substituents. In addition, the aryl radicals in a diallyl biphenol compound may be replaced by other groups such as the 1-methyl allyl, 2-methylallyl, and 2-chloroallyl groups, to obtain generally equivalent properties. In addition to the dibromobiphenol shown as illustrating the dihalobiphenols, it is apparent that other halo radicals such as the chloro- radical may replace the bromo radical, and that, again, the positions of the substituents on the biphenol structure may be varied as with the bicresols. In addition, the biphenol may have more than one phenolic hydroxyl radical on each benzene ring. The two phenolic rings may be separated in the molecular structure with an arylene group, for example, a phenylene group interposed between them. Such a compound is illustrated by p-terephenol-4,4''-diol.

The phenolic compounds of the invention referred to as "thiodiphenols" can be illustrated by the following examples: 4,4'-thiodiphenol, 2,2'-thiodiphenol, 2,2'-thiobis(4-chlorophenol), and 4,4'-thiobis(6-tertbutyl-m-cresol).

The phenolic compounds referred to as "sulfonyl diphenols" can be illustrated by the compounds 4,4'-sulfonyl diphenol and 2,4'-sulfonyl diphenol.

It is apparent that the sulfur in the thiodiphenols can be substituted with additional sulfur without affecting the reactivity of the compound in the process of the invention.

The mercapto phenols of the invention are the corresponding compounds obtained by reacting mercaptophenol rather than phenol itself with the corresponding aldehydes and ketones as illustrated in the preparation of the bisphenols hereinabove. Representative mercaptophenols include the ortho- and para- non-alkyl substituted mercaptophenols, as well as other mercaptophenols having an alkyl, alkylaryl, or arylalkyl substituent in which the substituent is at the ortho- or the para- position. There can be up to four such substituents on the mercaptophenol molecule. Examples of alkyl groups are methyl, ethyl, butyl, decyl, octadecyl; examples of alkylaryl and arylalkyl groups are cresyl, xylyl, tetramethylphenyl, decylphenyl, dodecylphenyl, and the like. Examples of typical compounds include phenyl mercaptophenols, mercaptonaphthols, and mercarptocresols, 2-mercapto-6-octadecylphenol, 4-mercaptophenol, 2-mercapto-4-chlorophenol, 2-mercapto-4,6-di-tert-butylphenyl, and o-mercaptophenol. It should also be noted that polyhydric mercaptophenols as well as mixtures of various mercaptophenols can be used. These compounds are similarly useful as compared to the bisphenols in providing an active hydrogen for reaction with the organic polyisocyanate of the invention.

The two phenolic rings can be separated in the molecular structure with an aryl bis alkylene radical interposed between them. Such a compound useful in the process of the invention can be obtained by reacting phenol with divinyl benzene to produce a three-ring structure corresponding to the structural formula hereinbelow. It is apparent that other phenols may be used as described hereinabove in combination with divinyl bezene to produce other compounds with a three-ring structure.

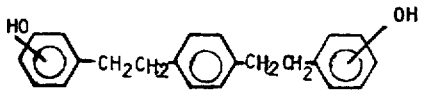

Suitable solvents or diluents for the penolic compounds of the invention include the aliphatic ketones of 3 to 8 carbon atoms, such as acetone, methyl ethyl ketone, methyl n-propyl ketone, diethyl ketone, hexanone, cyclohexanone, etc., the monoester-monoethers of alkylene glycols of 2 to 10 carbons atoms, such as ethylene glycol (Carbitol), diethylene glycol (Cellosolve), propylene glycol, butylene glycol, and the like. Typical members of the foregoing class include cellosolve acetate, methyl cellosolve acetate, butyl cellosolve acetate, carbitol acetate, butyl carbitol acetate, and mixtures thereof. Mixtures of the foregoing classes of solvents or diluents can also be employed. Auxiliary solvents can also be admixed with the foregoing classes of solvents or diluents, e.g., aromatic hydrocarbons of 6 to 10 carbon atoms, such as benzene, toluene, xylene, ethyl benzene, diethyl benzene, monochlorobenzene, and the like, aliphatic hydrocarbons, such as hexane, octane, mineral spirits, petroleum naphtha, and the like. The phenolic compound, organic polyisocyanate, and solvent are alcohol, until a uniform homogeneous mixture is formed. The solvent is generally employed in a ratio of about 20 alcohol; about 75 parts by weight per 100 parts of total mixed solids of said phenolic compound and organic polyisocyanate, preferably in a range from about 35 to about 60 parts by weight of solvent per 100 parts of total mixed solids of said phenolic compound and organic polyisocyanate.

Suitable solvents or diluents for mixtures of binder components comprising the phenolic compounds of the invention, the furan alcoholaldehyde condensation product, and the organic polyisocyanate are as heretofore described. The solvent is generally employed in the proportion of about 25 to about 65 parts by weight per 100 parts of total mixed solids of sid binder components, preferably in the proportion of from about 35 to about 55 parts by weight of solvent per 100 parts of total mixed solids of said binder components.

Various organic polyisocyanates can be used in preparing the compositions of the invention. Where the binder composition includes a component or components, other than the polyisocyanate, having a functionality averaging more than 2, diisocyanates and triisocyanates can be used such as 2,4-toluene diisocyanate, 2,6-toluene diisocyanate, and mixtures thereof, and particularly the crude mixtures thereof that are commercially available. Other typical polyisocyanates include methylene bis(4-phenyl) isocyanate, n-hexyl diisocyanate, 1,5-naphthalene diisocyanate, 1,3-cyclopentylene diisocyanate, p-phenylene diisocyanate, 2,4,6-toluene triisocyanate, 4,4', 4"-triphenylmethyl triisocyanate. Also contemplated are the many impure or crude polyisocyanates that are commercially available. Where the binder composition includes a component or components other than the polyisocyanate, having no more than difunctionality, polyisocyanates with a functionality averaging more than 2 are required. Especially preferred for use in the invention are the polyaryl polyisocyanates having the following generalized formula:

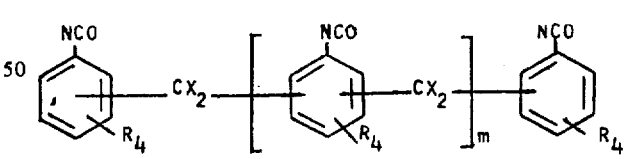

wherein $R_4$ is selected from the group consisting of hydrogen, chlorine, bromine, alkyl having 1 to 5 carbon atoms, and alkoxy having 1 to 5 carbon atoms; X is selected from the group consisting of hydrogen, alkyl having 1 to 10 carbon atoms, and phenyl; and $m$ has an average value of at least 0.5 and generally about 0.5 to 1.6, preferably 0.6 to about 1.3. A preferred example is polymethylene polyphenyl polyisocyanate having an average functionality of 3. The organic polyisocyanate is preferably employed in a solution of the solvents hereinbefore described, generally in a ratio of about 15 to about 50 parts by weight of solvent per 100 parts of solids of the organic polyisocyanate, preferably about 25 to about 40 parts by weight of solvent per 100 parts of the organic polyisocyanate.

A small amount of an auxiliary compound reactive with isocyanato groups can, if desired, be blended with the resinous condensation product. Exemplary compounds include hydroxyl terminated polyesters, i.e., the product of a glycol such as ethylene or propylene glycol, or a polyol such as glycerol, with an acid such as phthalic, adipic, succinic, and the like; polyethers such as polyethylene glycol, polypropylene glycol, and the like; phenol-formaldehyde resins; alkyds; alkanol amines such as ethanolamine, triethanolamine, n-butylethanolamine, 2-amino-2-methyl-1-propanol, and the like. The auxiliary compounds can comprise up to about 2 weight percent based on the weight of the total composition. Also, if desired, a conventional hydroxyl-isocyanate catalyst such as dibutyltin dilaurate, dibutyltin diacetate, zinc naphthanate, lead naphthanate, and the like, can be present in the resinous composition to the extent of about 0.1 to about 5 weight percent based on the total weight of the binder composition, preferably about 3 to about 5 weight percent.

In the preparation of the moldable compositions of the invention, foundry aggregate is placed in a conventional muller or other suitable mixer. The aggregate of discrete inert solid particles is normally sand and frequently contains minor amounts of other materials such as iron oxide, cereal, and the like. A binder component consisting of a solution of the (1) resinous condensation product, and (2) a phenolic compound is introduced to the aggregate in a proportion sufficient to provide about 0.4 to 5 weight percent of said binder component based on the weight of the foundry aggregate, preferably in the range of about 0.6 to 2.5 weight percent and is mixed for 1 to 10 minutes, preferably about 1 to about 3 minutes. The aggregate grains are thereby coated with the sand binder component. Thereafter, a polyisocyanate component consisting of a polyisocyanate or solution thereof is introduced to the mixture of aggregate, solvent, and said binder component and mixing is continued for about 1 to 5 minutes, preferably about 2 to 3 minutes. The organic polyisocyanate component is employed in a proportion sufficient to provide about 0.4 to about 5 weight percent of polyisocyanate component based on the weight of the foundry aggregate, preferably in the range of about 0.5 to 2.5 weight percent. the proportion of total binder components plus polyisocyanate component is in the range of about 0.8 to 10 weight percent based on the weight of foundry aggregate, preferably about 1 to 5 weight percent. The proportion of the resinous condensation product to phenolic compound in said binder component can be from 30 to 100%, with a proportion of about 30% to about 60% preferred in the mixed compositions. A portion of the solvent generally evaporates in the muller. The said binder component and polyisocyanate are employed in a ratio sufficient to provide about 0.9 to about 1.1 isocyanato groups per hydroxyl group, preferably about 1 isocyanato group per hydroxyl group. The resulting moldable composition is then discharged from the mixer and introduced into a suitable mold of the desired shape.

The moldable composition can also be prepared by employing an apparatus known as a "slinger" which comprises two screw conveyors which converge at a common point into a single screw conveyor. Herein, a portion of the foundry aggregate and the resin are introduced into one of the two feed screw conveyors. The polyisocyanate and the remainder of the foundry aggregate is introduced into the second of the feed screw conveyors. The two screw conveyors discharge the sand coated with the respective components into the common screw conveyor where all of the reacting components are intimately mixed with the total charge of foundry aggregate.

The moldable composition is introduced into a suitable mold and cured at room temperature by employing a tertiary amine as a catalyst. Although it is especially preferred to employ a gaseous tertiary amine, volatilized tertiary amines in an inert gas stream such as nitrogen, carbon dioxide or air can be employed. Suitable tertiary amines, which generally contain up to 20 carbon atoms, include trimethylamine, triethylamine, tributylamine, tripropylamine, dimethyl-sec-butylamine, N,N-dimethylaniline, N-methyl-N-ethylaniline, p-nitroso-N,N-dimethylaniline, N-methyl morpholine, N-ethyl morpholine, tetramethylguanidine, N,N,N',N'-tetramethyl-1,3-butanediamine, triethylenediamine, and the like. The preferred gaseous teretiary amine is triethylamine. Gassing can be effected by placing manifolds across the top and bottom of the core to form a tight seal and then passing the gaseous amine or volatilized amine in an inert gas stream through the core.

The moldable compositions of the invention can be cured at room temperature or, if desired, at higher or lower curing temperatures, i.e, from about 10° to about 100°C. or higher, to form a polyurethane reaction product of the hydroxyl containing components of the binder component and the polyisocyanate. The cured foundry aggregate compositions generally contain about 0.5 to about 9 weight percent of total polyurethane binder composition (dry basis) based on the weight of foundry aggregate, preferably about 0.5 to about 5 weight percent. The compositions exhibit superior properties, such as flexuarl strength, flowability of the binder aggregate composition, release from the mold, retention of strength at elevated temperatures (e.g., 150°–300°F), compared to conventional cured foundry molds and cores.

The following examples illustrate the various aspects of the invention but are not intended to limit it. Where not otherwise specified throughout this specification and claims, temperatures are given in degrees centigrade and parts are by weight.

EXAMPLE 1

A resin was prepared by heating 90 parts of furfuryl alcohol and 4.5 parts of 37 percent formalin to reflux in the presence of sulfuric acid. Reflux was maintained util a refractive index of the resin was in the range of 1.5340 to 1.5370. Thereafter, sodium hydroxide was added to neutralize the acid and the reaction mixture was vacuum dehydrated to a Karl-Fischer moisture content of 3.6 percent. The resin was determined to have a specific gravity of 1.224, a Brookfield centipoise viscosity at 25° centigrade of 1700 and a refractive index of 1.5390.

EXAMPLE 2

One part of the resin of Example 1 was added to 100 parts of Wedron 7020 sand in a muller and mixed for 2 minutes. Thereafter, one part oof a 75 percent reactive solids solution of polymethylene polyphenyl polyisocyanate in xylene solvent, said polyisocyanate having a functionality of 2.6, was added to the muller and mixing was continued for an additional 2 minutes. The resulting moldable composition was molded into 1 × 1 × 9 inch bars and cured by passing trimethylamine gas through the sand mixture at various temperatures. The flexural strength in pounds per square inch and flexural modulus were thereafter determined, and are shown in Table 1.

TABLE I

| CURING CONDITIONS | FLEXURAL STRENGTH | FLEXURAL MODULUS |
|---|---|---|
| Room Temperature | 507 | $2.99 \times 10^5$ |
| 150°F. for 1 hour; Tested at 150°F. | 346 | $1.11 \times 10^5$ |
| 300°F. for 1 hour; Tested at 300°F. | 350 | $9.39 \times 10^4$ |

EXAMPLE 3

Eighty parts of the resin of Example 1 was blended with 13 parts of xylene, 5 parts of Cellosolve acetate and 2 parts of Thanol R-650-X, an alkanol amine. The blended resin had a specific gravity of 1.147, a Brookfield centipoise viscosity of 125 at 25° centigrade and a refractive index of 1.5240.

EXAMPLE 4

Example 2 was repeated except that the resin of Example 1 was replaced by the resin of Example 3. The flexural strength in pounds per square inch and the flexural modulus are shown in Table II.

TABLE II

| CURING CONDITIONS | FLEXURAL STRENGTH | FLEXURAL MODULUS |
|---|---|---|
| Room Temperature | 454 | $1.38 \times 10^6$ |
| 150°F. for 1 hour; Tested at 150°F. | 584 | $1.67 \times 10^6$ |
| 300°F. for 1 hour Tested at 300°F. | 546 | $1.43 \times 10^6$ |

EXAMPLE 5

A resin was prepared as described in Example 1 except that a corn starch (Sweetose 4300) was employed in place of the formalin. The resin had a Karl-Fischer moisture content of 0.37, a Brookfield centipoise viscosity of 535 at 25° centigrade and a refractive index of 1.5331. The resin was mixed with sand and molded following the procedure of Example 2 and thereafter cured by passing triethylamine in nitrogen through the sand mixture for 10 seconds followed by a 10 second purge with nitrogen.

EXAMPLE 6

The procedures of Examples 1 and 2 were repeated except that two parts of ethylene glycol were added to the resin prior to mixing the resin with the sand. Triethylamine in nitrogen gas was applied for 10 seconds followed by a 10 second purge with nitrogen. The tensile strength 15 seconds after gassing was determined to be 100 psi.

EXAMPLE 7

The procedures of Examples 1 and 2 were repeated substituting trimethylolpropane for the formalin, triethylamine in nitrogen for the trimethylamine and employing a gas cycle of 10 seconds gassing and 10 seconds purging with nitrogen. The tensile strength was determined to be 100 psi. after one minute.

EXAMPLE 8

A resin was prepared by heating 100 parts of furfuryl alcohol, 41.5 parts of 37 percent formalin, 0.88 parts of 10 percent oxalic acid in water and 0.40 parts of triethanolamine to reflux. Thereafter, the reaction mixture was neutralized and dehydrated to a Karl-Fischer moisture content of 1.4. The resin had a specific gravity of 1.261, a Brookfield centipoise viscosity of 53,500 at 25° centigrade and a refractive index of 1.5518. The resin was mixed with sand and molded as described in Example 2. The mixture was cured by passing trimethylamine gas through the molded composition for 10 seconds followed by a 10 second purge of nitrogen. The molded bars had developed a tensile strength of 32 psi. 15 seconds after gassing.

EXAMPLE 9

One part of the resin of Example 1 was added to 100 parts of Wedron 7020 sand in a muller and mixed for 2 minutes. Thereafter, 1 part of a 75 percent solution in xylol of toluene diisocyanate was added to the muller and mixing was continued for an additional 2 minutes. The resulting moldable composition was molded into 1 × 1 × 9 inch bars and cured by passing trimethylamine gas through the sand mixture.

EXAMPLE 10

Eighty parts of the resin of Example 1 was blended with 13 parts of xylene, 5 parts of Carbitol acetate and 2 parts of Thanol R-650-X, an alkanol amine. The blended resin had a specific gravity of 1.138, a Brookfield centipoise viscosity of 148 at 25° centigrade, and a refractive index of 1.5250.

EXAMPLES 11-14

Foundry aggregate binders are produced by the procedure of Example 1 substituting the following furan alcohols for the furfuryl alcohol.

| Example | Furan Alcohol |
|---|---|
| 11 | 2-(2-furyl)ethyl alcohol |
| 12 | 3-(2-furyl)propyl alcohol |
| 13 | methyl furfuryl alcohol |
| 14 | chloro-furfuryl alcohol |

EXAMPLE 15

Thirty parts of the resin of Example 1 were added to 30 parts of Bisphenol A, 20 parts of xylene, 15 parts of Cellosolve acetate, and 5 parts of furfuryl alcohol. The mixture was stirred until both Bisphenol A and the resin of Example 1 were dissolved. Thereafter, three quarters of a part of this solution was added to 100 parts of lake sand (AFS-45) in a muller and mixed for 2 minutes. Thereafter, three quarters of a part of the polymethylene polyphenyl polyisocyanate of Example 2 was added to the muller and mixing was continued for an additional 2 minutes. The resulting moldable composition was rammed into a 1 inch tensile pattern and cured by passing triethylamine (T.E.A.) gas through the sand mixture at room temperature, followed by a nitrogen purge. Subsequently, the tensile strength in pounds per square inch was determined after the molded compositions had aged 15 minutes and also after 60 minutes. The test results are shown in Table III:

TABLE III

| CURING TIME (seconds at room temperature) | | TENSILE STRENGTH (lbs.) | |
|---|---|---|---|
| T.E.A. Gas | Nitrogen Purge | After 15 Min. | After 60 Min. |
| 5 | 5 | 165 | 188 |
| 10 | 10 | 178 | 198 |
| 15 | 10 | 175 | 180 |

EXAMPLE 16

A binder component solution was made up using 20 parts of the resin of Example 1, 40 parts of Bisphenol A, 15 parts of xylene, 15 parts of Cellosolve acetate, 5 parts of acetone and 5 parts of furfuryl alcohol. The components were mixed thoroughly to insure complete solubility and, thereafter, three-quarters of a part of this binder solution was added to 100 parts of lake sand (AFS-45) in a muller and mixed for 2 minutes. Thereafter, three-quarters of a part of polymethylene polyphenyl polyisocyanate of Example 2 was added to the muller and mixing was continued for an additional 2 minutes. The resulting moldable composition was rammed into a 1 inch tensile pattern and curved by passing triethylamine gas through the sand mixture for various time intervals at room temperature. The tensile strength in pounds per square inch was thereafter determined on samples which had aged 15 minutes after the curing and nitrogen purge as well as after 60 minutes. The results are shown in Table IV:

| CURING TIME (seconds at room temp.) | | TENSILE STRENGTH (lbs.) | |
|---|---|---|---|
| T.E.A. Gas | Nitrogen Purge | After 15 min. | After 60 Min. |
| 5 | 5 | 160 | 170 |
| 10 | 10 | 198 | 223 |
| 15 | 15 | 198 | 180 |

EXAMPLE 17

A binder component solution was made up by adding 60 parts of Bisphenol A (para, para'-isopropylidenediphenol) to 20 parts of Cellosolve acetate and 20 parts of acetone. The components were thoroughly mixed to insure solvation of the Bisphenol A. Thereafter three quarters of a part of this Bisphenol A solution was added to 100 parts of lake sand (AFS-45) and mixed in a muller for 2 minutes. Thereafter, three quarters of a part of polymethylene polyphenyl polyisocyanate of Example 2 was added to the muller and mixing was continued for an additional 2 minutes. The resulting moldable composition was rammed into a one inch tensile pattern and cured by passing triethylamine gas through the sand mixture at various time intervals, followed by passage of nitrogen through the sand mixture for an equivalent amount of time. All curing was done at room temperature. The tensile strength in pounds per square inch was thereafter determined and results are shown in Table V.

TABLE V

| CURING TIME (seconds at room temp.) | | TENSILE STRENGTH (lbs.) | |
|---|---|---|---|
| T.E.A. Gas | Nitrogen Purge | After 15 min. | After 60 min. |
| 5 | 5 | 66 | 105 |
| 10 | 10 | 106 | 186 |

EXAMPLE 18

The procedure of Example 17 was repeated except that the ratio of Bisphenol A solution to the polymethylene polyphenyl polyisocyanate was changed from three quarters of a part of each to 0.6 parts of Bisphenol A solution in combination with 0.9 parts of polymethylene polyphenyl polyisocyanate. Test results are shown in Table VI:

TABLE VI

| CURING TIME (seconds at room temp.) | | TENSILE STRENGTH (lbs.) | |
|---|---|---|---|
| T.E.A. Gas | Nitrogen Purge | After 15 Min. | After 60 Min. |
| 5 | 5 | 66 | 105 |
| 10 | 10 | 106 | 186 |

EXAMPLE 18

The procedure of Example 17 was repeated except that the ratio of Bisphenol A solution to the polymethylene polyphenyl polyisocyanate was changed from three-quarters of a part of each to 0.6 parts of Bisphenol A solution in combination with 0.9 parts of polymethylene polyphenyl polyisocyanate. Test results are shown in Table VI:

TABLE VII

| CURING TIME (seconds at room temp.) | | TENSILE STRENGTH (lbs.) | |
|---|---|---|---|
| T.E.A. Gas | Nitrogen Purge | After 15 Min. | After 60 Min. |
| 5 | 5 | 148 | 158 |
| 10 | 10 | 120 | 157 |

EXAMPLE 19 — control — forming no part of this invention)

Following the procedure of Example 16 a foundry sand mixture was prepared by admixing 20 parts of the phenolic resin shown as Resin A in Column 8 of U.S. Pat. No. 3,409,579, 20 parts of butyl acetate and 20 parts of polymethylene polyphenyl polyisocyanate with 2,000 parts of lake sand in a muller. The mixing was continued for two minutes until the binder was evenly distributed on the sand particles. The resulting moldable composition was rammed into a one inch tensile pattern and cured by passing triethylamine gas through the sand mixture at various time intervals. The tensile strength in pounds per square inch was thereafter determined. Results are shown in Table VIII.

TABLE VIII

| CURING TIME (seconds at room temperature) | | TENSILE STRENGTH (lbs.) | |
|---|---|---|---|
| T.E.A. Gas | Nitrogen Purge | After 15 Min. | After 60 Min. |
| 5 | 5 | 238 | 270 |
| 10 | 10 | 233 | 265 |
| 15 | 10 | 248 | 258 |

While this invention has been described with reference to certain specific embodiments, it will be recognized by those skilled in the art that many variations are possible without departing from the spirit and the scope of the invention. The various embodiments of the invention disclosed herein serve to further illustrate the invention, but are not intended to limit it.

What is claimed is:

1. A binder composition for foundry aggregates which comprises a solution of an inert solvent and a room temperature curable composition comprising (1) an organic polyisocyanate of the formula:

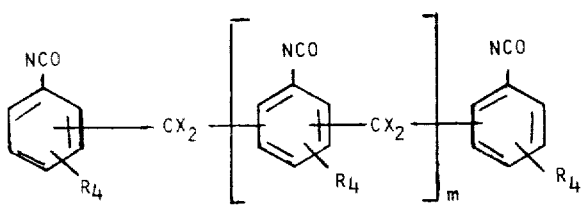

wherein $R_4$ is selected from the group consisting of hydrogen, chlorine, bromine, alkyl having 1 to 5 carbon atoms, and alkoxy having 1 to 5 carbon atoms; X is selected from the group consisting of hydrogen, alkyl having 1 to 10 carbon atoms, and phenyl; and m has an average value of at least about 0.5, and (2) a phenolic compound of the formula:

wherein X is oxygen or sulfur, y is an alkylidene radical, an aryl bis alkylene radical, an arylene radical, —S—, —S—S—, or

$n$ is 0 or 1, and $R_1$ and $R_1$ are hydrogen, alkyl of 1 to 6 carbon atoms or halogen, and wherein said polyisocyanate is present in a proportion to provide from about 0.9 to 1.1 reactive isocyanate groups per reactive hydrogen present in said curable composition.

2. The composition of claim 1 wherein the phenolic compound is a bisphenol.

3. The composition of claim 2 wherein the solvent is a ketone.

4. A foundry aggregate composition comprising a foundry aggregate and the composition of claim 1 wherein said composition is present in the proportions of about 1 to about 10 percent by weight based upon the weight of said foundry aggragate.

5. A composition which comprises the composition of claim 4 cured with a tertiary amine.

6. A composition comprising (1) an organic polyisocyanate and (2) a mixture of (A) a substantially non-aqueous organic solvent soluble condensation product of an aldehyde and a furan alcohol of the formula:

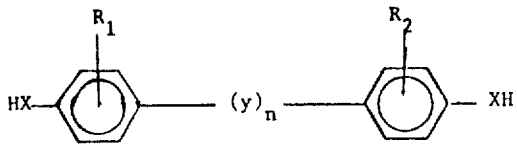

wherein X is 0 to 4 and wherein each R is individually selected from the group consisting of hydrogen, alkyl, or halogen, and (B) a phenolic compound of the formula;

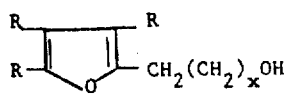

wherein X is oxygen or sulfur, y is an alkylidene radical, an aryl bis alkylene radical, an arylene radical, —S—, —S—S—, or $$-\overset{O}{\underset{\|}{S}}-,$$

$n$ is 0 or 1, and $R_1$ and $R_2$ are hydrogen, alkyl of 1 to 6 carbon atoms or halogen.

7. A composition which comprises a solution of an inert solvent and a room temperature curable composition comprising (1) an organic polyisocyanate of the formula:

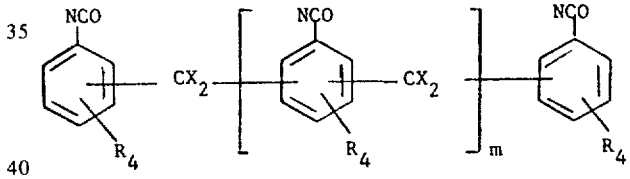

wherein $R_4$ is selected from the group consisting of hydrogen, chlorine, bromine, alkyl having 1 to 5 carbon atoms, and alkoxy having 1 to 5 carbon atoms; X is selected from the group consisting of hydrogen, alkyl having 1 to 10 carbon atoms, and phenyl; and m has an average value of at least about 0.5, (2) a mixture of (A) a substantially non-aqueous organic solvent soluble condensation product of an aldehyde and a furan alcohol of the formula:

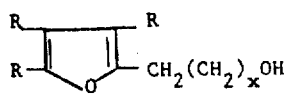

wherein $x$ is 0 to 4 and wherein each R is individually selected from the group consisting of hydrogen, alkyl, or halogen, and (B) a phenolic compound of the formula:

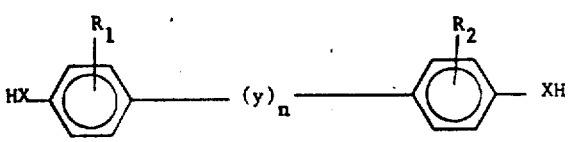

wherein X is oxygen or sulfur, y is an alkylidene radical, an aryl bis alkylene radical, an arylene radical, —S—, —S—S—, or

n is 0 or 1, and $R_1$ and $R_2$ are hydrogen, alkyl of 1 to 6 carbon atoms or halogen, and wherein said polyisocyanate is present in a proportion to provide from about 0.9 to 1.1 reactive isocyanate groups per reactive hydrogen present in said curable composition.

8. The composition of claim 7 wherein the phenolic compound is a bisphenol.

9. The composition of claim 8 wherein the solvent is a mixture of a ketone and aromatic solvent.

10. A binder composition for foundry aggregates comprising the composition of claim 7.

11. A foundry aggregate composition comprising a foundry aggregate and the binder composition of claim 7 wherein said binder is present in the proportion of about 1 to about 10 percent by weight based upon the weight of said foundry aggregate.

12. A composition which comprises the composition of claim 11 cured with a tertiary amine.

13. A process for bonding discrete inert, solid particles which comprises (1) coating said particles with a solution of a binder in an organic solvent, said binder selected from the group consisting of:

(A) an organic polyisocyanate and a substantially non-aqueous organic solvent soluble condensation product of an aldehyde and a furan alcohol of the formula:

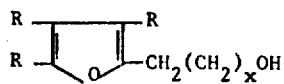

wherein x is 0 to 4, and wherein each R is individually selected from the group consisting of hydrogen, alkyl, and halogen and a solvent;

B. a mixture of (A) and a phenolic compound of the formula:

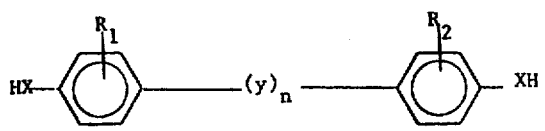

wherein X is oxygen or sulfur, Y is an alkylidene radical, an aryl bis alkylene radical, an arylene radical, —S—, —S—S—, or

n is 0 or 1, and $R_1$ and $R_2$ are hydrogen, alkyl of 1 to 6 carbon atoms or halogen; and (2) curing the resulting composition.

14. The process of claim 13 wherein the furan alcohol is furfuryl alcohol and the aldehyde is formaldehyde.

15. The process of claim 14 wherein the composition is cured by passing a tertiary amine therethrough.

16. The process of claim 15 wherein the organic polyisocyanate is a polyaryl polyisocyanate and the solvent is xylene.

17. The process of claim 13 wherein the phenolic compound is a bisphenol.

18. The process of claim 17 wherein the phenolic compound is Bisphenol A and the composition is cured by passing a tertiary amine therethrough.

19. The process of claim 18 wherein the organic polyisocyanate is a polyaryl polyisocyanate and the solvent is a mixture of xylene and cellosolve acetate.

20. The process of claim 18 wherein the tertiary amine is triethylamine

21. The process of claim 18 wherein the organic polyisocyanate is a polyaryl polyisocyanate and the solvent is a mixture of xylene and acetone.

22. The composition of claim 1 wherein m has an average value of about 0.6 to about 1.3.

23. The composition of claim 7 wherein m has an average value of about 0.6 to about 1.3.

24. A binder composition for foundry aggregates which comprises a room temperature curable composition comprising (1) an organic polyisocyanate of the formula:

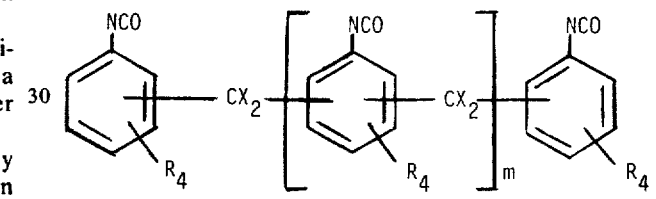

wherein $R_4$ is selected from the group consisting of hydrogen, chlorine, bromine, alkyl having 1 to 5 carbon atoms, and alkoxy having 1 to 5 carbon atoms; X is selected from the group consisting of hydrogen, alkyl having 1 to 10 carbon atoms, and phenyl; and m has an average value of at least about 0.5, and (2) a phenolic compound of the formula:

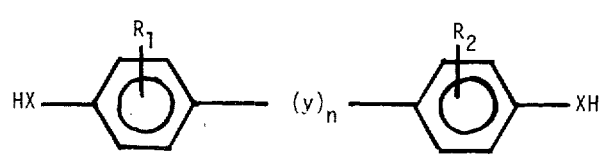

wherein X is oxygen or sulfur, y is an alkylidene radical, an aryl bis alkylene radical, an arylene radical, —S—, —S—S—, or

n is 0 or 1, and $R_1$ and $R_2$ are hydrogen, alkyl of 1 to 6 carbon atoms or halogen, and wherein said polyisocyanate is present in a proportion to provide from about 0.9 to 1.1 reactive isocyanate groups per reactive hydrogen present in said curable composition. aa 25. The binder composition of claim 24 wherein the phenolic compound is a bisphenol and m has an average value of about 0.6 to about 1.3.

26. A foundry aggregate composition comprising a foundry aggregate and a room temperature curable binder composition comprising (1) an organic polyisocyanate of the formula:

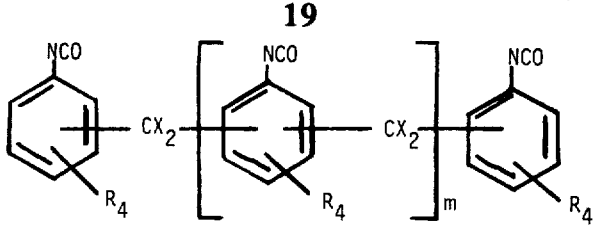

wherein $R_4$ is selected from the group consisting of hydrogen, chlorine, bromine, alkyl having 1 to 5 carbon atoms, and alkoxy having 1 to 5 carbon atoms; X is selected from the group consisting of hydrogen, alkyl having 1 to 10 carbon atoms, and phenyl; and m has an average value of at least about 0.5, and wherein said polyisocyanate is present in a proportion to provide from about 0.9 to 1.1 reactive isocyanate groups per reactive hydrogen present in said curable composition, and (2) a phenolic compound of the formula:

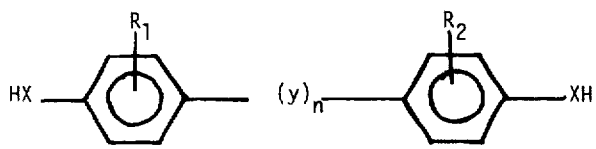

wherein X is oxygen or sulfur, y is an alkylidene radical, an arylene radical, —S—, —S—S—, or

$n$ is 0 or 1, and $R_1$ and $R_2$ are hydrogen, alkyl of 1 to 6 carbon atoms and halogen, wherein said binder is present in the proportions of about 1 to about 10 percent by weight based upon the weight of said foundry aggregate.

27. The composition of claim 26 wherein m has an average value of about 0.6 to about 1.3.

28. The composition of claim 26 wherein said phenolic compound is a bisphenol.

29. A foundry aggregate composition which comprises the composition of claim 10 cured with a tertiary amine.

30. The foundry aggregate composition of claim 26 wherein the phenolic compound is bisphenol A and the composition is cured by passing therethrough triethylamine.

31. A foundry aggregate composition comprising a foundry aggregate and a room temperature curable binder composition comprising (1) an organic polyisocyanate and (2) a mixture of
   A. a substantially non-aqueous organic solvent soluble condensation produce of an aldehyde and a furan alcohol of the formula:

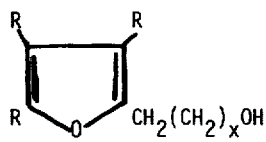

wherein $x$ is 0 to 4 and wherein each R is individually selected from the group consisting of hydrogen, alkyl, and halogen, and
   B. a phenolic compound of the formula:

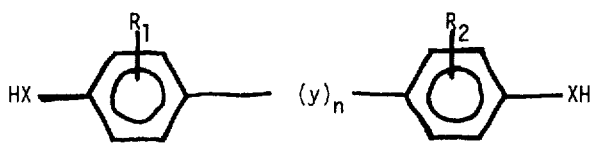

wherein X is oxygen or sulfur, y is an alkylidene radical, an arylene radical, —S—, —S—S—, or

$n$ is 0 or 1, and $R_1$ and $R_2$ are hydrogen, alkyl of 1 to 6 carbon atoms and halogen, wherein said binder is present in the proportions of about 1 to 10 percent by weight based upon the weight of said foundry aggregate.

32. The composition of claim 31 wherein the phenolic compound is a bisphenol.

33. The composition of claim 32 wherein the solvent is a mixture of ketone and an aromatic solvent.

34. A foundry aggregate composition comprising a foundry aggregate and a room temperature curable binder composition comprising (1) an organic polyisocyanate of the formula:

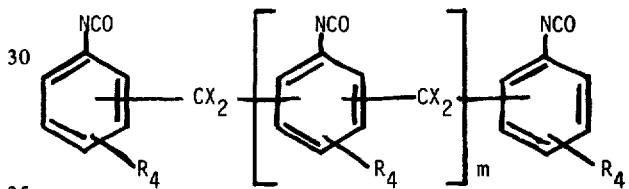

wherein $R_4$ is selected from the group consisting of hydrogen, chlorine, bromine, alkyl having 1 to 5 carbon atoms, and alkoxy having 1 to 5 carbon atoms; X is selected from the group consisting of hydrogen, alkyl having 1 to 10 carbon atoms, and phenyl; and m has an average value of at least about 0.5, and wherein said polyisocyanate is present in a proportion to provide from about 0.9 to 1.1 reactive isocyanate groups per reactive hydrogen present in said curable composition, and (2) mixtures of
   A. a substantially non-aqueous organic solvent soluble condensation product of an aldehyde and a furan alcohol of the formula:

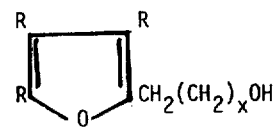

wherein $x$ is 0 to 4 and wherein each R is individually selected from the group consisting of hydrogen, alkyl, and halogen, and
   B. a phenolic compound of the formula:

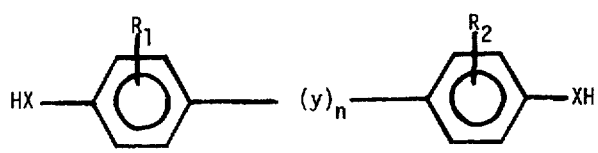

wherein X is oxygen or sulfur, y is an alkylidene radical, an arylene radical, —S—, —S—S—, or

$n$ is 0 to 1, and $R_1$ and $R_2$ are hydrogen, alkyl of 1 to 6 carbon atoms and halogen, wherein said binder is present in the proportion of about 1 to 10 percent by weight based upon the weight of said foundry aggregate.

35. The composition of claim 34 wherein the phenolic compound is a bisphenol.

36. The foundry aggregate composition comprising the composition of claim 34 wherein said furan alcohol is furfuryl alcohol, said aldehyde is formaldehyde, said phenolic compound is bisphenol A and the composition is cured by passing therethrough triethylamine.

37. The foundry aggregate composition of claim 34 cured with a tertiary amine.

38. A process for bonding discrete inert, solid particles which comprises (1) coating said particles with a room temperature curable binder comprising:
A. an organic polyisocyanate of the formula:

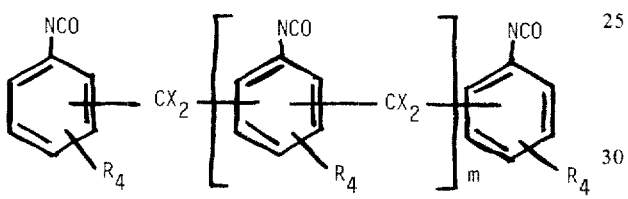

wherein $R_4$ is selected from the group consisting of hydrogen, chlorine, bromine, alkyl having 1 to 5 carbon atoms, and alkoxy having 1 to 5 carbon atoms, X is selected from the group consisting of hydrogen, alkyl having 1 to 10 carbon atoms, and phenyl; and $m$ has an average value of at least about 0.5, and
B. a bisphenol of the formula:

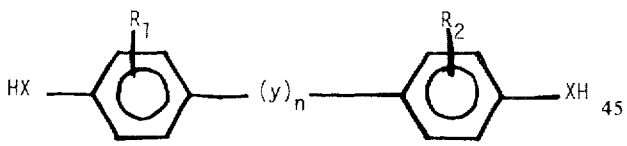

wherein X is oxygen or sulfur, $y$ is an alkylidene radical, an arylene radical, —S—, —S—S—, or

$n$ is 0 or 1, and $R_1$ and $R_2$ are hydrogen, alkyl of 1 to 6 carbon atoms and halogen, and solvent, and (2) curing the resulting composition in the presence of a tertiary amine.

39. The process of claim 38 wherein m has an average value of about 0.6 to about 1.3.

40. The process claim 38 wherein the phenolic compound is a bisphenol A and the composition is cured by passing a tertiary amine therethrough.

41. The process of claim 38 wherein the organic polyisocyanate is a polyaryl polyisocyanate.

42. The process of claim 40 wherein the tertiary amine is triethylamine.

43. A process for bonding discrete inert, solid particles which comprises (1) coating said particles with a room temperature curable binder selected from the group consisting of:
A. An organic polyisocyanate of the formula:

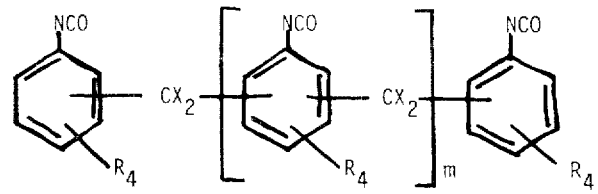

wherein $R_4$ is selected from the group consisting of hydrogen, chlorine, bromine, alkyl having 1 to 5 carbon atoms, and alkoxy having 1 to 5 carbon atoms, X is selected from the group consisting of hydrogen, alkyl having 1 to 10 carbon atoms, and phenyl; and $m$ has an average value of at least about 0.5, and a bisphenol of the formula:

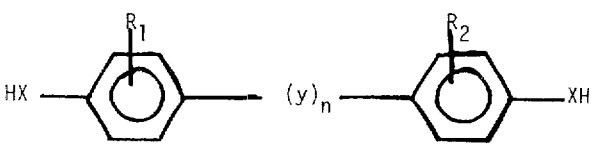

wherein X is ocygen or sulfur, y is an alkylidene radical and arylene radical —S—, —S—S—, or

$n$ is 0 or 1, and $R_1$ and $R_2$ are hydrogen, alkyl of 1 to 6 carbon atoms and halogen, and solvent, and
B. mixtures of (A) and a substantially non-aqueous organic solvent soluble condensation product of an aldehyde and a furan alcohol of the formula:

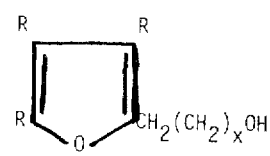

wherein X is 0 to 4, and wherein each R is individually selected from the group consisting of hydrogen, alkyl, and halogen; and (2) curing the resulting composition in the presence of a tertiary amine.

44. The process of claim 43 wherein m has an average value of about 0.6 to about 1.3.

45. The process of claim 44 wherein said aldehyde is formaldehyde, said furan alcohol is furfuryl alcohol, said bisphenol is bisphenol-A, and said binder is cured by passing therethrough triethylamine.

* * * * *

UNITED STATES PATENT OFFICE
CERTIFICATE OF CORRECTION

PATENT NO. : 3,925,296
DATED : Dec. 9, 1975
INVENTOR(S) : Jonathan A. Stone; Albert W. Bluemle It is certified that error appears in the above-identified patent and that said Letters Patent are hereby corrected as shown below:

Column 6, line 46, "dihaiobiphenols" should read--dihalobiphenols--.
Column 8, line 4, "are alcohol, until" should read--are mixed until--; line 6, "20 alcohol," should read--20 to--.
Column 9, line 39, "The-rafter" should read--Thereafter,--.
Column 10, line 54-Example I, "util" should read--until--.

Signed and Sealed this
Second Day of November 1976

[SEAL]

Attest:

RUTH C. MASON
*Attesting Officer*

C. MARSHALL DANN
*Commissioner of Patents and Trademarks*